UNITED STATES PATENT OFFICE.

CAMPBELL MORFIT, OF NEW YORK, N. Y.

IMPROVEMENT IN SUBSTITUTES FOR WAX.

Specification forming part of Letters Patent No. 26,697, dated January 3, 1860.

*To all whom it may concern:*

Be it known that I, CAMPBELL MORFIT, chemist, of the city, county, and State of New York, have invented a new and useful composition of matter adapted to most of the purposes for which beeswax is now used; and I do hereby declare that the following is a clear and exact description thereof.

The advantages obtained by my invention are the production of a material to be called "japan-wax," so closely resembling wax in its appearance and certain physical properties that it may be substituted therefor at a great saving of cost in the manufacture of candles, tapers, match-stems, wax-flowers, and can be used with special advantage for coating stearine and tallow candles, thus indurating their surface as well as improving their appearance and burning qualities. It may also be applied to various other useful purposes.

The materials I use in preparing this substitute for wax are the Japan vegetable wax of commerce and paraffine obtained by the distillation of coals and bituminous shales, the two being thoroughly mixed by fusion in a double-bottom kettle heated by currents of steam or otherwise, so as to prevent scorching, and then cast into blocks to be used in making dipping-baths, in which to indurate the surface of tallow and stearine used for candle-stock. The proportions which I have found to answer a good purpose is Japan vegetable wax, eight pounds, and paraffine, sixteen pounds; but these proportions may be slightly varied without changing the character of the invention.

What I claim as my invention, and desire to secure by Letters Patent, is—

The use of Japan vegetable wax in combination with paraffine, in the manner and for the purposes herein set forth.

CAMPBELL MORFIT.

Witnesses:
L. D. GALE,
EDM. F. BROWN.